US012488728B2

(12) United States Patent
Ma et al.

(10) Patent No.: US 12,488,728 B2
(45) Date of Patent: Dec. 2, 2025

(54) IMAGE DATA TRANSMISSION DEVICE AND METHOD, ELECTRONIC APPARATUS, MEDIUM, AND DISPLAY SYSTEM

(71) Applicant: BOE TECHNOLOGY GROUP CO., LTD., Beijing (CN)

(72) Inventors: Xitong Ma, Beijing (CN); Tailiang Li, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 17/908,000

(22) PCT Filed: Aug. 3, 2021

(86) PCT No.: PCT/CN2021/110281
§ 371 (c)(1),
(2) Date: Aug. 30, 2022

(87) PCT Pub. No.: WO2023/010275
PCT Pub. Date: Feb. 9, 2023

(65) Prior Publication Data
US 2024/0212562 A1 Jun. 27, 2024

(51) Int. Cl.
*G09G 3/20* (2006.01)
*G09G 5/00* (2006.01)

(52) U.S. Cl.
CPC ........... *G09G 3/2092* (2013.01); *G09G 5/008* (2013.01); *G09G 2360/128* (2013.01); *G09G 2370/08* (2013.01)

(58) Field of Classification Search
CPC ................. G09G 3/2092; G09G 5/008; G09G 2360/128; G09G 2370/08
See application file for complete search history.

(56) References Cited

U.S. PATENT DOCUMENTS

2015/0049103 A1* 2/2015 Kumeta .................. G09G 5/39 345/534
2017/0132987 A1 5/2017 Kato
2019/0164518 A1* 5/2019 Dimitrov .............. G09G 5/393

FOREIGN PATENT DOCUMENTS

CN 1384959 A 12/2002
CN 1429453 A 7/2003
(Continued)

OTHER PUBLICATIONS

English Translation of CN 101291390 (Year: 2008).*
English Translation of CN 112702553 (Year: 2021).*
English Translation of JP 2021093034 (Year: 2021).*

*Primary Examiner* — Patrick N Edouard
*Assistant Examiner* — Eboni N Giles
(74) *Attorney, Agent, or Firm* — HOUTTEMAN LAW LLC

(57) ABSTRACT

The disclosure provides an image data transmission device including: receiving sub-circuit, writing control component, and reading control component. The disclosure further provides an image data transmission method, including: in response to the receiving sub-circuit being in locked state, receiving, by receiving sub-circuit, image data sent by a mainboard, and writing, according to a first frame synchronous signal, the image data received from the mainboard in each clock cycle of the first frame synchronous signal into a frame of a memory, reading, according to a second frame synchronous signal, a frame from the memory in each clock cycle of the second frame synchronous signal; sending each frame read from the memory to a display component; and in response to the receiving sub-circuit being in unlocked state, stopping writing the image data into the memory. The disclosure further provides an electronic apparatus, a computer-readable medium and a display system.

16 Claims, 5 Drawing Sheets

(56) References Cited

FOREIGN PATENT DOCUMENTS

| | | | |
|---|---|---|---|
| CN | 101291390 | A | 10/2008 |
| CN | 201197171 | Y | 2/2009 |
| CN | 106851262 | A | 6/2017 |
| CN | 107329929 | A | 11/2017 |
| CN | 108279949 | A | 7/2018 |
| CN | 111918009 | A | 11/2020 |
| CN | 113068070 | A | 7/2021 |
| JP | 2003319338 | A | 11/2003 |

* cited by examiner

IMAGE DATA TRANSMISSION DEVICE AND METHOD, ELECTRONIC APPARATUS, MEDIUM, AND DISPLAY SYSTEM

CROSS-REFERENCE TO RELATED APPLICATION

This is a National Phase Application filed under 35 U.S.C. 371 as a national stage of PCT/CN2021/110281, filed on Aug. 3, 2021.

TECHNICAL FIELD

The present disclosure relates to the field of video image technologies, and in particular, to an image data transmission device, an image data transmission method, an electronic apparatus, a computer-readable medium, and a display system.

BACKGROUND

At present, when the frame rate of a video signal input by a signal source changes, a reference clock corresponding to video image data sent by a mainboard changes accordingly. However, an interface of an intermediate device between the mainboard and a display terminal does not support dynamic change of the clock, resulting in that a signal is unlocked, signal transmission between the intermediate device and the mainboard is disconnected, and signal transmission between the intermediate device and the display terminal is also disconnected due to the above influence. In addition, due to disconnection of the signal transmission, the display terminal enters a self-checking state immediately, and plays a circulating picture corresponding to the self-checking state, resulting in a problem of abnormal display.

SUMMARY

The present disclosure is directed to solving at least one of the technical problems of the related art, and provides an image data transmission device, an image data transmission method, an electronic apparatus, a computer-readable medium, and a display system.

To achieve the above object, in a first aspect, an embodiment of the present disclosure provides an image data transmission device, including: a receiving sub-circuit configured to receive image data sent by a mainboard; a writing control component configured to write, in response to the receiving sub-circuit being in a locked state, image data received by the receiving sub-circuit in each clock cycle of a first frame synchronous signal into a frame of a memory according to the first frame synchronous signal, the first frame synchronous signal being an associated clock signal, and to stop, in response to the receiving sub-circuit being in an unlocked state, writing the image data to the memory; a reading control component configured to read, in response to the receiving sub-circuit being in the locked state, a frame from the memory in each clock cycle of a second frame synchronous signal according to the second frame synchronous signal, wherein a first time interval exists between writing and reading a same frame, the first time interval has a length greater than or equal to a length of the clock cycle of the first frame synchronous signal, and the second frame synchronous signal is a local clock signal; and a sending component configured to send the frame read by the reading control component to a display component.

In some embodiments, the image data transmission device further includes: a selecting component, the reading control component is further configured to read the frame from the memory in each clock cycle of the second frame synchronous signal and send the frame to the selecting component; the selecting component is configured to send, in response to the receiving sub-circuit being in the locked state, each frame read by the reading control component to the sending component; and to send, in response to the receiving sub-circuit being in the unlock state, a predetermined prompt frame to the sending component; and the sending component is configured to send the frame selected by the selecting component to the display component.

In some embodiments, the image data transmission device further includes a phase-locked loop component configured to parse and recovery the first frame synchronous signal; and adjust the receiving sub-circuit to the locked state or the unlocked state.

In some embodiments, the phase-locked loop component is further configured to set a clock recovery lock signal sent to the mainboard to be at a low level in response to adjusting the receiving sub-circuit to the locked state; and set the clock recovery lock signal sent to the mainboard to be at a high level in response to adjusting the receiving sub-circuit to the unlocked state.

In some embodiments, the reading control component is further configured to read, in response to the receiving sub-circuit being in the locked state, the frame from the memory in each clock cycle of the second frame synchronous signal after a first target falling edge of the first frame synchronous signal, and wherein the first target falling edge is the second falling edge following a falling edge of the clock recovery lock signal.

In some embodiments, the selecting component is further configured to send, in response to the receiving sub-circuit being adjusted to the unlocked state, the prompt frame to the sending component after a second time interval, and wherein the second time interval has a length smaller than or equal to a length of the clock cycle of the second frame synchronous signal.

In some embodiments, the selecting component is further configured to send, in response to the receiving sub-circuit being adjusted to the unlocked state, the prompt frame to the sending component after a second target falling edge of the second frame synchronous signal, and wherein the second target falling edge is the first falling edge following a rising edge of the clock recovery lock signal.

In some embodiments, when handshake is performed with the mainboard according to a VBO protocol, the phase-locked loop component is further configured to adjust the receiving sub-circuit to the locked state after clock data recovery is completed.

In some embodiments, the phase-locked loop component is further configured to adjust the receiving sub-circuit from the locked state to the unlocked state in response to an increase or a decrease of a frequency of an associated clock signal of the mainboard.

In a second aspect, an embodiment of the present disclosure further provides an image data transmission method, including: in response to a receiving sub-circuit being in a locked state, receiving, by the receiving sub-circuit, image data sent by a mainboard, and writing, according to a first frame synchronous signal, the image data received from the mainboard in each clock cycle of the first frame synchronous signal into a frame of a memory, the first frame synchronous signal being an associated clock signal; in response to the receiving sub-circuit being in the locked state, reading, according to a second frame synchronous signal, a frame from the memory in each clock cycle of the second frame synchronous signal, wherein a first time interval exists between writing and reading a same frame, the first time interval has a length greater than or equal to a length of a clock cycle of the first frame synchronous signal, and the second frame synchronous signal is a local clock signal; sending each frame read from the memory to a display component; and in response to the receiving sub-circuit being in an unlocked state, stopping writing the image data into the memory.

In some embodiments, the method further includes: in response to the receiving sub-circuit being in the locked state, sending each frame read from the memory to the display component; and in response to the receiving sub-circuit being in the unlocked state, sending a predetermined prompt frame to the display component.

In some embodiments, before writing, according to a first frame synchronous signal, the image data received from the mainboard in each clock cycle of the first frame synchronous signal into a frame of a memory, the image data transmission method further includes: handshaking with the mainboard according to a VBO protocol, wherein after clock data recovery is completed, the receiving sub-circuit is adjusted to the locked state, and a clock recovery lock signal sent to the mainboard is set to be at a low level.

In some embodiments, reading, according to a second frame synchronous signal, a frame from the memory in each clock cycle of the second frame synchronous signal includes: detecting a first target falling edge of the first frame synchronous signal in response to the receiving sub-circuit being adjusted to the locked state, wherein the first target falling edge is the second falling edge following a falling edge of the clock recovery lock signal; and reading the frame from the memory in each clock cycle of the second frame synchronous signal after the first target falling edge.

In some embodiments, in response to an increase or decrease of a frequency of an associated clock signal of the mainboard, the receiving sub-circuit is adjusted from the locked state to the unlocked state, and the clock recovery lock signal sent to the mainboard is set to be at a high level.

In some embodiments, in response to the receiving sub-circuit being in the unlocked state, sending a predetermined prompt frame to the display component includes: in response to the receiving sub-circuit being adjusted to the unlocked state, sending the prompt frame to the display component after a second time interval, wherein the second time interval has a length less than or equal to a length of the clock cycle of the second frame synchronous signal.

In some embodiments, in response to the receiving sub-circuit being adjusted to the unlocked state, sending the prompt frame to the display component after a second time interval includes: detecting a second target falling edge of the second frame synchronous signal in response to the receiving sub-circuit being adjusted to the unlocked state, wherein the second target falling edge is the first falling edge following a rising edge of the clock recovery lock signal; and after the second target falling edge, sending the prompt frame to the display component.

In a third aspect, an embodiment of the present disclosure further provides an electronic apparatus, which includes: one or more processors; and a memory for storing one or more programs, wherein the one or more programs, when executed by the one or more processors, cause the one or more processors to implement the image data transmission method as in any of the above embodiments.

In some embodiments, the processor includes a field programmable gate array.

In a fourth aspect, an embodiment of the present disclosure further provides a computer-readable medium, on which a computer program is stored, and the computer program, when executed by a processor, implements the steps in the image data transmission method as in any one of the above embodiments.

In a fifth aspect, an embodiment of the present disclosure further provides a display system, which includes: a mainboard, an image data transmission device, and a display component, wherein the image data transmission device is the image data transmission device in any one of the above embodiments.

DETAIL DESCRIPTION OF EMBODIMENTS

In order to enable those skilled in the art to better understand the technical solutions of the present disclosure, an image data transmission device, an image data transmission method, an electronic apparatus, a computer-readable medium, and a display system provided in the present disclosure are described in detail below with reference to the accompanying drawings.

Example embodiments will be described more fully hereinafter with reference to the accompanying drawings, but may be embodied in different forms and should not be construed as being limited to the embodiments set forth herein. Rather, these embodiments are provided so that the present disclosure will be thorough and complete, and will fully convey the scope of the present disclosure to those skilled in the art.

The terms used herein are merely for the purpose of describing particular embodiments and are not intended to limit the present disclosure. As used herein, the singular forms "a", "an", and "the" are intended to include the plural forms as well, unless the context clearly indicates otherwise. It will be further understood that the terms "include" and/or "made of", when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. Thus, a first element, component, or module discussed below could be referred to as a second element, component, or module without departing from the teachings of the present disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having meanings that are consistent with their meanings in the context of the related art and the present disclosure, and will not be interpreted in an idealized or overly formal sense unless expressly so defined herein.

Figure 1:
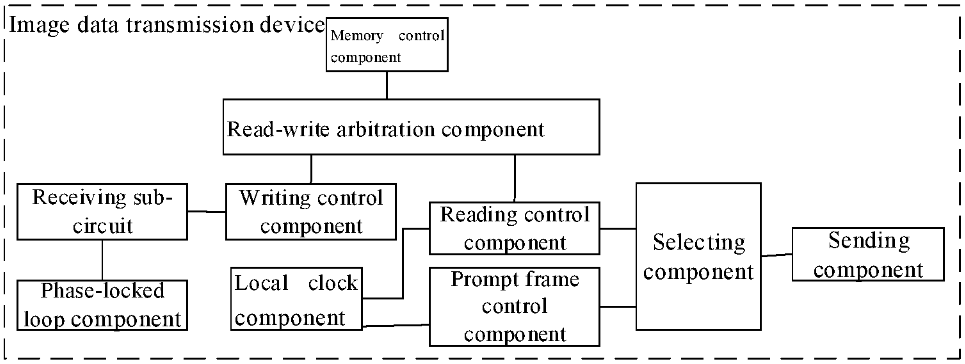
FIG. 1 is a schematic structural diagram of an image data transmission device according to an embodiment of the present disclosure.

FIG. 1 is a schematic structural diagram of an image data transmission device according to an embodiment of the present disclosure. As shown in FIG. 1, the image data transmission device includes: a receiving sub-circuit, a writing control component, a reading control component and a sending component.

In an embodiment, the receiving sub-circuit is configured to receive image data sent by a mainboard.

The receiving sub-circuit maintains the image data lane with the mainboard in a locked state, and is out of lock to the clock in an unlocked state, in which the receiving sub-circuit cannot receive image data based on the original clock. The receiving sub-circuit is mostly identified as RX; the mainboard may be a system on chip (SoC for short) and is configured to process video image signals of various formats, and convert them into signal formats agreed with the image data transmission device, or convert them into signal formats corresponding to the receiving sub-circuit.

The writing control component is configured to write, in response to the receiving sub-circuit being in the locked state, the image data received by the receiving sub-circuit in each clock cycle of a first frame synchronous signal into a frame of the memory according to the first frame synchronous signal of the mainboard, the first frame synchronous signal being an associated clock signal; and stop, in response to the receiving sub-circuit being in an unlocked state, writing the image data to the memory.

The associated clock signal is a clock synchronized with a data signal as input, and the receiver of the data signal performs corresponding operations on the received data according to the associated clock signal. In an embodiment of the present disclosure, the associated clock signal is a synchronous clock signal corresponding to the image data sent by the mainboard, and needs to change as various parameters (such as a frame rate) of the image data change, and the first frame synchronous signal and the associated clock signal of the mainboard belong to the same clock domain. A plurality of frame regions are pre-configured in the memory, and each frame is stored in the corresponding frame region according to a frame address distributed during writing. In some embodiments, the memory is a Double Data Rate Synchronous Random Access Memory (DDR SDRAM or DDR for short).

The reading control component is configured to read, in response to the receiving sub-circuit being in the locked state, a frame from the memory in each clock cycle of a second frame synchronous signal according to the second frame synchronous signal. A first time interval exists between writing and reading of the same frame, the first time interval is longer than or equal to the length of the clock cycle of the first frame synchronous signal, and the second frame synchronous signal is a local clock signal. The second frame synchronous signal corresponds to a local clock of the image data transmission device, and may be generated by a corresponding component inside the image data transmission device, such as a local crystal oscillator or a local clock component as shown in the figure. The second frame synchronous signal is only changed according to local configuration, and is not changed along with a frequency change of the input signal, and in order to ensure stable transmission with the output object, in some embodiments, the local clock is fixed and stable.

In order to prevent reading null data, the writing control component reserves the time it takes to write one or more frames. After waiting for at least a clock cycle of the first frame synchronous signal, a frame starts to be read from the memory. In some embodiments, the second frame synchronous signal is equal in the length of the clock cycle to the first frame synchronous signal; alternatively, in some embodiments, the second frame synchronous signal and the first frame synchronous signal have the same length of the clock cycle and a predetermined phase difference therebetween.

The sending component is configured to send the frame read by the reading control component to the display component.

In some embodiments, the display component includes a Tcon board and a display, and the sending component is configured to send the frame read by the reading control component to the Tcon board.

In some embodiments, as shown in the drawings, the image data transmission device further includes: a selecting component.

Specifically, the reading control component is configured to read a frame from the memory in each clock cycle of the second frame synchronous signal and send the frame to the selecting component.

In some embodiments, the reading control component is further configured to stop reading data from the memory in response to the receiving sub-circuit being in the unlocked state.

The selecting component is configured to send, in response to the receiving sub-circuit being in the locked state, each frame read by the reading control component to the sending component; and to send, in response to the receiving sub-circuit being in the unlocked state, a predetermined prompt frame to the sending component.

In some embodiments, the selecting component sends the prompt frame to the sending component before the reading control component starts to read a frame, i.e., while waiting in the first time interval; and the prompt frame is used to indicate signal loss, for example, a specific font or graphic is displayed in an On Screen Display (OSD) manner to prompt that no signal exists currently. In some embodiments, the prompt frame is also referred to as a background frame.

In some embodiments, as shown in the drawings, the image data transmission device further includes a prompt frame control component, which is configured to store the prompt frame and send the prompt frame to the selecting component at each clock cycle of the second frame synchronous signal according to the second frame synchronous signal, so that the selecting component may send the preset prompt frame to the sending component when the receiving sub-circuit is in the unlocked state.

The sending component sends the frame read by the reading control component or the prompt frame, which is selected by the selecting component to the display component; the sending component is mostly identified as TX. In some embodiments, the sending component sends the image frame to be sent to the Tcon board in the display component. The Tcon board is also called a logic board or a control board, and the Tcon board receives the image frame and then sends the image frame to a display terminal in the display component for display.

Specifically, the receiving side corresponding to the writing control component and the receiving sub-circuit belongs to a first clock domain based on the first frame synchronous signal, the sending side corresponding to the reading control component, the selecting component, and the sending component belongs to a second clock domain based on the second frame synchronous signal, and the prompt frame control component in the above embodiments also belongs to the second clock domain.

In some embodiments, as shown in the drawings, the image data transmission device further includes: a read-write arbitration component configured to control and coordinate read and write operations, and a memory control component configured to maintain the memory and manage memory addresses, and a storage side corresponding to the read-write arbitration component and the memory control component belongs to a third clock domain based on a memory clock.

In the related art, the receiving side and the sending side of the image data transmission device belong to the same clock domain, for example, a clock domain based on the first frame synchronous signal. When a frame rate of a video signal of a signal source changes, an associated clock corresponding to an image signal sent by the mainboard also changes adaptively. Because an interface (such as a high-speed serial interface) of the device does not support dynamic change of a clock, the first frame synchronous signal cannot be adjusted in time, and thus the clock out-of-lock occurs in the whole device, signal transmission between the device and each of the mainboard and a display terminal is disconnected, and the display terminal enters a self-checking state due to loss of signal. The display terminal enters the self-checking state when the data locking cannot be performed, and displays an internal picture under the self-checking state, and the internal picture is usually a picture in which colors such as red, green, blue and the like are circulated.

According to the image data transmission device provided by the embodiments of the present disclosure, since the receiving side thereof adopts the associated clock corresponding to the mainboard (signal source) and the image signal, as the reference clock for image data transmission, and the sending side thereof adopts the local clock of the image data transmission device as the reference clock for image data transmission, when clock out-of-lock occurs at the receiving side, the sending side continuously works based on the second frame synchronous signal, continuously reads and sends the pre-stored valid data or other valid data, and the signal transmission with the display component and the display terminal will not be disconnected. In some embodiments, when the clock out-of-lock occurs at the receiving side and the connection with the mainboard needs to be adjusted, the data reading is stopped, and a prompt frame is provided to the display terminal for display, so that the stable connection of the sending side is ensured, the transmission of valid data exists between the sending side and the display terminal, and the display terminal is prevented from displaying abnormally and entering a self-checking state due to the change of a signal source.

In some embodiments, as shown in the drawings, the image data transmission device further includes: a phase-locked loop component.

The phase-locked loop component is configured to parse and recover the first frame synchronous signal; and adjust the receiving sub-circuit to the locked state or the unlocked state.

In some embodiments, the phase-locked loop component is specifically configured to adjust, when performing handshake with the mainboard according to a VBO protocol (V-BY-ONE), the receiving sub-circuit to the locked state after Clock Data Recovery training (CDR training for short) is completed. In some embodiments, the phase-locked loop component is specifically configured to adjust the receiving sub-circuit from the locked state to the unlocked state in response to an increase or decrease in a clock frequency of an associated clock signal of the mainboard. The mainboard is coupled to the receiving sub-circuit via a plurality of pairs of signal lines. When the frame rate of the video signal of the signal source changes, the frequency of the associated clock corresponding to the image signal sent by the mainboard will also change adaptively. When the device senses that the data reception is influenced by asynchronous clock, the receiving sub-circuit is adjusted from the locked state to the unlocked state, and the communication between the mainboard and the device is disconnected.

In some embodiments, the phase-locked loop component is further configured to set, when the receiving sub-circuit is adjusted to the locked state, a clock recovery lock signal (LOCKN) sent to the mainboard at a low level; and set, when the receiving sub-circuit is adjusted to the unlocked state, the clock recovery lock signal sent to the mainboard at a high level.

The clock recovery lock signal may be sent to the mainboard by the receiving sub-circuit.

In some embodiments, for the connection relationship established according to the VBO protocol, the mainboard does not directly transmit the associated clock signal. The image data transmission device needs to parse the clock data from the data transmitted by the mainboard in the clock data recovery stage during the handshake to recover the associated clock, so as to obtain the first frame synchronous signal, that is, the first frame synchronous signal is the associated clock signal of the mainboard recovered at the device side.

Specifically, when the image data transmission device performs handshake with the mainboard according to VBO protocol, connection is established first, and when VBO connection with the mainboard is stable, a Hot Plug Detect Signal (HTPDN for short) sent to the mainboard is pulled down from a high level to a low level, in which case the mainboard sends a clock data recovery test sequence to the receiving sub-circuit, and a clock data recovery stage is entered, so that the image data transmission device recovers the associated clock. After the clock data recovery of the image data transmission device is completed, the phase-locked loop component adjusts the receiving sub-circuit to the locked state and pulls down the clock recovery lock signal sent to the mainboard from a high level to a low level, in which case the mainboard sends an alignment test sequence to the receiving sub-circuit, and an alignment training (ALN training for short) stage is entered so as to correspond effective pixels to bytes in signals sent by the mainboard subsequently; after the alignment is completed, the mainboard starts to send image data.

In some embodiments, the reading control component is specifically configured to read, in response to the receiving sub-circuit being adjusted to the locked state, a frame from the memory in each clock cycle of the second frame synchronous signal after the first target falling edge of the first frame synchronous signal. The first target falling edge is the second falling edge following a falling edge of the clock recovery lock signal.

It should be noted that the expression "the receiving sub-circuit is in the locked state or in the unlocked state" described in the embodiments of the present disclosure is to emphasize the state that persists over a period of time, and the expression "the receiving sub-circuit is adjusted to the locked state or the unlocked state" is to emphasize the state change at a certain time.

In some embodiments, the detecting of the first target falling edge of the first frame synchronous signal is performed by a control plane or a corresponding component of the image data transmission device. In some embodiments, based on necessary hardware logic, the image data transmission device first generates a first frame synchronous enable signal according to the first frame synchronous signal, a high level region of the first frame synchronous enable signal containing the high level region of the first frame synchronous signal on a time axis; generates a first frame synchronous selection signal according to a result of AND operation performed on the first frame synchronous signal and the first frame synchronous enable signal; delays the first frame synchronous selection signal by a certain time interval to generate a first frame synchronous selection delay signal; determines a pulse width according to a falling edge of the first frame synchronous selection signal and a falling edge of the first frame synchronous selection delay signal; and generates a first frame synchronous pulse signal according to the falling edge of the first frame synchronous selection signal and the pulse width, the rising edge of the first frame synchronous pulse signal and the first target falling edge being at the same time; and then, sends the first frame synchronous pulse signal to the selecting component to indicate the corresponding time of the first target falling edge, and triggers the selecting component to send each frame read by the reading control component to the sending component. Thereby, on the basis of reserving the first time interval, reading data is started after the first target falling edge to ensure that enough frames are pre-stored.

It should be noted that, the above description of determining the first target falling edge is only an optional implementation provided by the embodiment of the present disclosure, and does not limit the technical solutions of the present disclosure, and other manners for determining the first target falling edge are also applicable to the technical solutions of the present disclosure.

In some embodiments, the selecting component is specifically configured to send, in response to the receiving sub-circuit being adjusted to the unlocked state, the prompt frame to the sending component after a second time interval elapses, and the second time interval has a length less than or equal to a length of the clock cycle of the second frame synchronous signal.

In order to prevent reading conflict, at most one clock cycle of the second frame synchronous signal is reserved, and after the current frame is ensured to be completely read by the reading control component and output by the selecting component, the prompt frame is sent to the sending component.

In some embodiments, the selecting component is specifically configured to send, in response to the receiving sub-circuit being adjusted to the unlocked state, the prompt frame to the sending component after the second target falling edge of the second frame synchronous signal, and the second target falling edge is the first falling edge following a rising edge of the clock recovery lock signal. In some embodiments, the second target falling edge corresponds to an end time of the second time interval.

In some embodiments, the detecting of the second target falling edge of the second frame synchronous signal is performed by a control plane or a corresponding component of the image data transmission device. In some embodiments, based on necessary hardware logic, similarly to determining the first target falling edge, the image data transmission device first generates a second frame synchronous enable signal according to the second frame synchronous signal, a high level region of the second frame synchronous enable signal containing a high level region of the second frame synchronous signal on a time axis; generates a second frame synchronous selection signal according to a result of AND operation performed on the second frame synchronous signal and the second frame synchronous enable signal; delays the second frame synchronous selection signal by one clock cycle to generate a second frame synchronous selection delay signal; determines a pulse width according to a falling edge of the second frame synchronous selection signal and a falling edge of the second frame synchronous selection delay signal, and generates a second frame synchronous pulse signal according to the falling edge of the second frame synchronous selection signal and the pulse width, the rising edge of the second frame synchronous pulse signal and the second target falling edge being at the same time; and then, sends a second frame synchronous pulse signal to the selecting component to indicate the corresponding time of the second target falling edge, and triggers the selecting component to send the prompt frame to the sending component.

Therefore, by reserving the second time interval, the prompt frame is sent to the display component in response to the receiving sub-circuit being in the unlocked state after the reading of the current frame by the reading control component is finished, so as to maintain data output at the sending side and ensure the stable connection.

Figure 2:
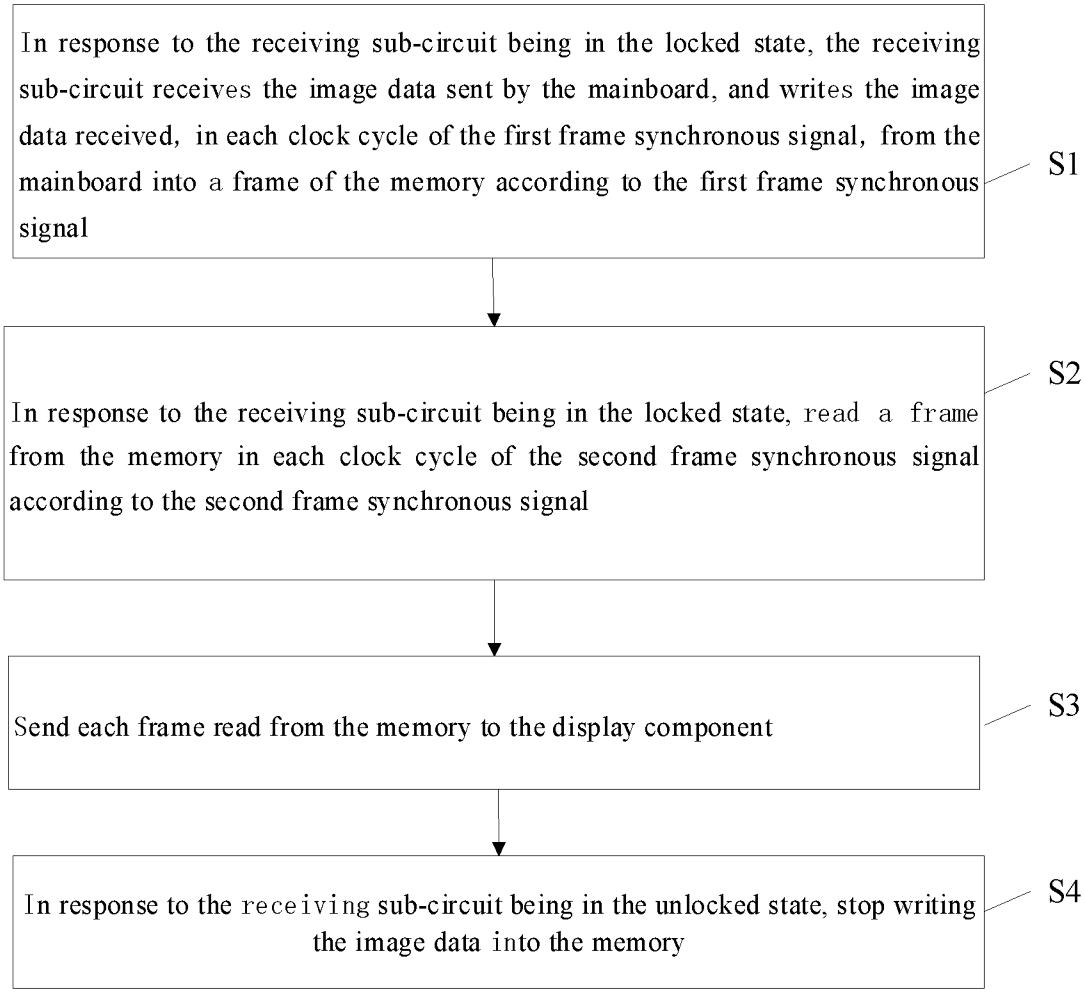
FIG. 2 is a flowchart of an image data transmission method according to an embodiment of the present disclosure.

FIG. 2 is a flowchart of an image data transmission method according to an embodiment of the present disclosure. As shown in FIG. 2, the method includes Steps S1 to S4.

In Step S1, in response to the receiving sub-circuit being in the locked state, the receiving sub-circuit receives the image data sent by the mainboard, and writes the image data received, in each clock cycle of the first frame synchronous signal, from the mainboard into a frame of the memory according to the first frame synchronous signal.

The first frame synchronous signal is an associated clock signal and may be used for dividing image data and determining each video frame transmitted by the mainboard. Specifically, the receiving sub-circuit maintains image data lane with the mainboard in the locked state, and is out of lock to the clock in the unlocked state and thus cannot receive the image data based on the original clock. A plurality of frame regions are pre-configured in the memory, and each frame is stored in the corresponding frame region according to the frame address distributed during writing.

In some embodiments, Step S1 of writing the image data received, in each clock cycle of the first frame synchronous signal, from the mainboard into a frame of the memory according to the first frame synchronous signal includes: in any clock cycle of the first frame synchronous signal, writing the image data received from the mainboard into a frame corresponding to the current frame address, and adding 1 to the current frame address. In some embodiments, the method further includes: after power-on, initializing the current frame address.

Step S2 includes, in response to the receiving sub-circuit being in the locked state, reading a frame from the memory in each clock cycle of the second frame synchronous signal according to the second frame synchronous signal.

A first time interval exists between writing and reading the same frame, the first time interval has a length greater than or equal to the length of the clock cycle of the first frame synchronous signal. In terms of the lock signal, a first time interval exists between the starting time of the second frame synchronous signal and the starting time of the first frame synchronous signal. The second frame synchronous signal is a local clock signal. In order to prevent reading of null data, a time for writing one or more frames is reserved before reading data, and reading a frame from the memory is started after waiting for at least one clock cycle of the first frame synchronous signal.

In some embodiments, Step S2 of reading a frame from the memory in each clock cycle of the second frame synchronous signal according to the second frame synchronous signal includes: in any clock cycle of the second frame synchronous signal, taking a frame address obtained by subtracting 1 from the current frame address as a target frame address, and reading data from a frame corresponding to the target frame address.

Step S3 includes sending each frame read from the memory to the display component.

Step S4 includes, in response to the receiving sub-circuit being in the unlocked state, stopping writing the image data into the memory.

When the receiving sub-circuit is in the unlocked state, the writing of image data is stopped, and the reading of the image data and outputting the image data to the display component are not influenced.

In some embodiments, in response to the frequency of the associated clock signal of the mainboard increasing or decreasing, the receiving sub-circuit is adjusted from the locked state to the unlocked state, and the clock recovery lock signal sent to the mainboard is set to be at a high level.

When the frame rate of the video signal of the signal source changes, the associated clock corresponding to the image signal sent by the mainboard also changes in frequency adaptively, that is, the frequency of the corresponding clock increases or decreases.

The embodiments of the present disclosure provide an image data transmission method, which separates the timing sequence control of the receiving side corresponding to data receiving operation and data writing operation from the timing sequence control of the sending side corresponding to data reading operation and data sending operation. The receiving side carries out the timing sequence control based on the first frame synchronous signal corresponding to the mainboard (signal source) and an image signal of the mainboard, the sending side carries out the timing sequence control based on the second frame synchronous signal of the sending side. When the frame rate of video image of the signal source changes and thus the associated clock signal changes along therewith, the clock of the receiving side is out of lock, but the sending side continuously works based on the second frame synchronous signal, continues to send valid data, and does not disconnect the signal transmission with a display component and a display terminal.

Figure 3:
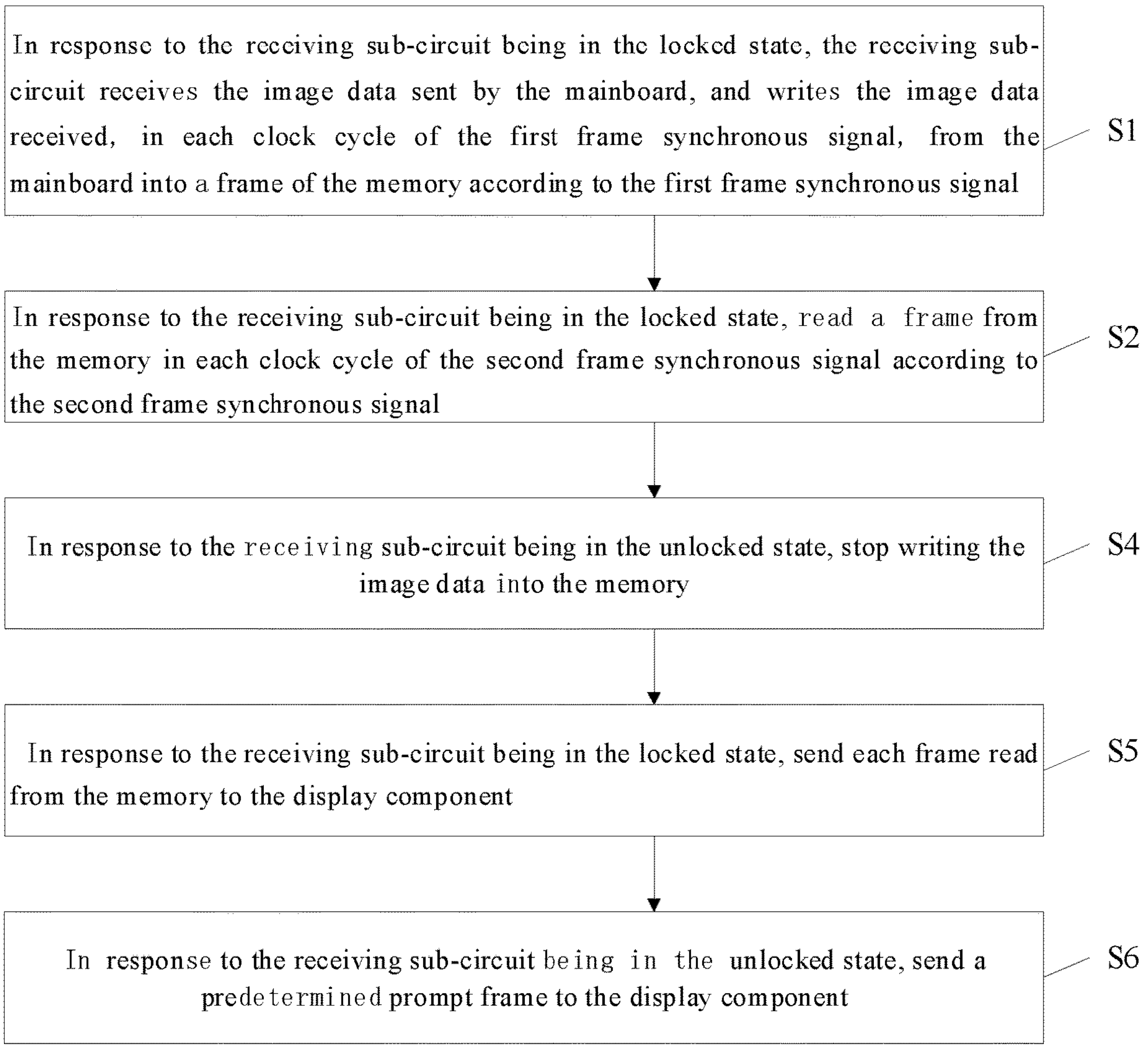
FIG. 3 is a schematic flowchart of another image data transmission method according to an embodiment of the present disclosure.

FIG. 3 is a schematic flowchart of another image data transmission method according to an embodiment of the disclosure. As shown in FIG. 3, the method is a specific and optional implementation based on the method shown in FIG. 2. Specifically, the method includes not only Step S1, Step S2, and Step S4 but also Step S5 and Step S6. Only Step S5 and Step S6 will be described in detail below.

Step S5 includes, in response to the receiving sub-circuit being in the locked state, sending each frame read from the memory to the display component.

Step S6 includes, in response to the receiving sub-circuit being in the unlocked state, sending a predetermined prompt frame to the display component.

In some embodiments, in response to the receiving sub-circuit being in the unlocked state, reading the data from the memory is stopped, and a predetermined prompt frame is sent to the display component.

The prompt frame is used for indicating signal loss, and may be used as display content of the display terminal when the mainboard has no image data input and the receiving sub-circuit is out of lock and cannot receive the image data sent by the mainboard.

Therefore, the embodiments of the disclosure provide an image data transmission method, in which a corresponding receiving side performs timing sequence control based on the first frame synchronous signal corresponding to the mainboard (signal source) and the image signal of the mainboard, and a corresponding sending side performs timing sequence control based on the second frame synchronous signal of the sending side, so that the sending side is not affected by the change of the associated clock signal, and the signal transmission with the display component and the display terminal is kept stable. Meanwhile, during the clock out-of-lock of the receiving side, a prompt frame is provided to the display terminal for display, the displayable valid data is kept being continuously transmitted, and the display terminal is prevented from displaying abnormally and entering a self-checking state.

Figure 4:
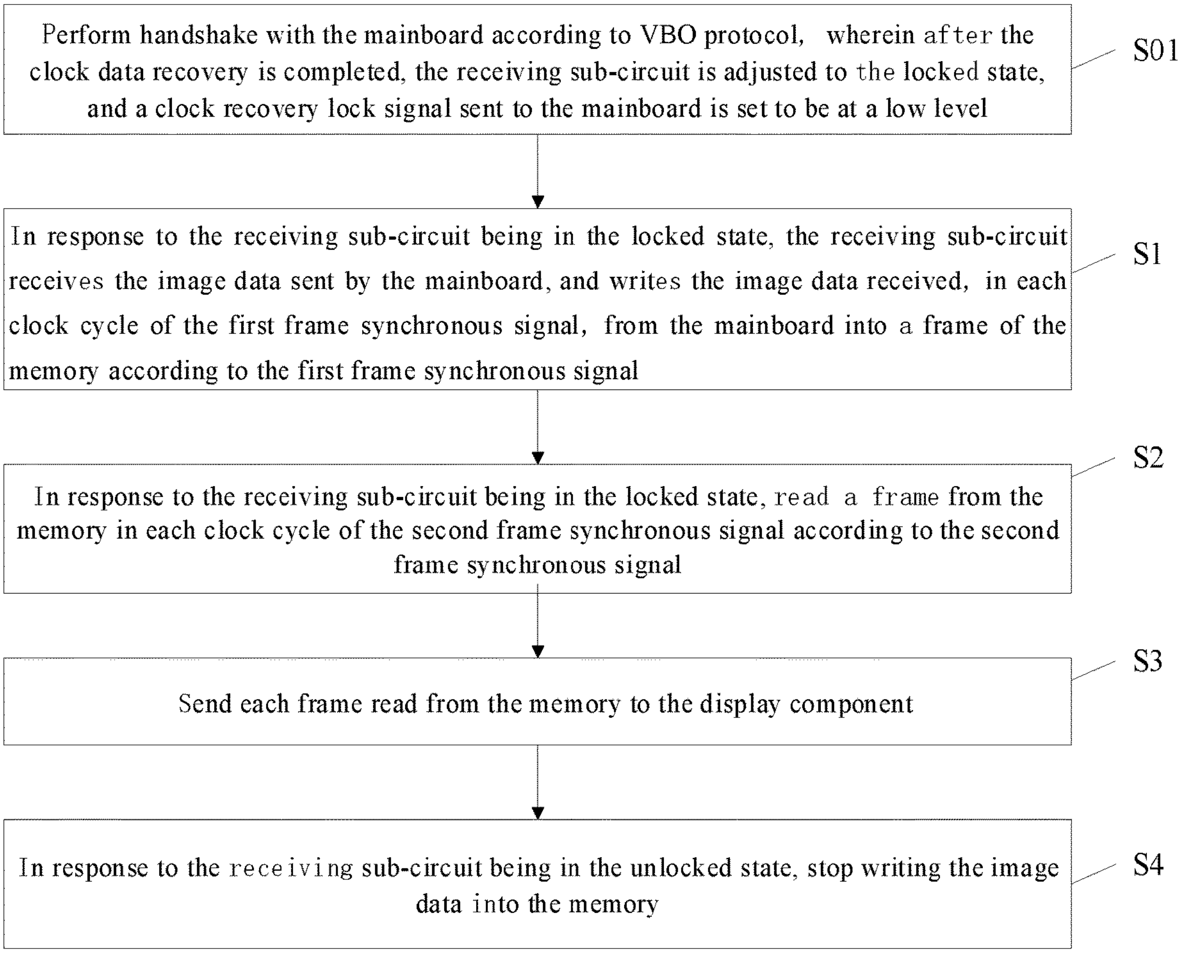
FIG. 4 is a schematic flowchart of another image data transmission method according to an embodiment of the present disclosure.

FIG. 4 is a schematic flowchart of another image data transmission method according to an embodiment of the present disclosure. As shown in FIG. 4, the method is a specific and optional implementation based on the method shown in FIG. 2 or FIG. 3. Specifically, the figure shows a case based on the method shown in FIG. 2, which includes not only Step S1 through Step S3, but also Step S01 prior to Step S1. Only step S01 will be described in detail below.

Step S01 includes performing handshake with the mainboard according to VBO protocol. After the clock data recovery is completed, the receiving sub-circuit is adjusted to the locked state, and the clock recovery lock signal sent to the mainboard is set to be at a low level.

According to connection relationship established based on the VBO protocol, the mainboard does not directly transmit the associated clock signal. The image data transmission device needs to parse the clock data from the data transmitted by the mainboard in the clock data recovery stage during handshaking so as to recover the associated clock signal, and obtain the first frame synchronous signal.

In some embodiments, the method further includes: in response to the receiving sub-circuit being adjusted to the unlocked state, performing handshake with the mainboard again according to the VBO protocol, and accordingly, after clock data recovery is completed, re-adjusting the receiving sub-circuit to the locked state. The recovered first frame synchronous signal is adjusted by the step to be synchronized with the mainboard and the signal source, and then the corresponding steps of step S1 to step S5 are performed.

Figure 5:
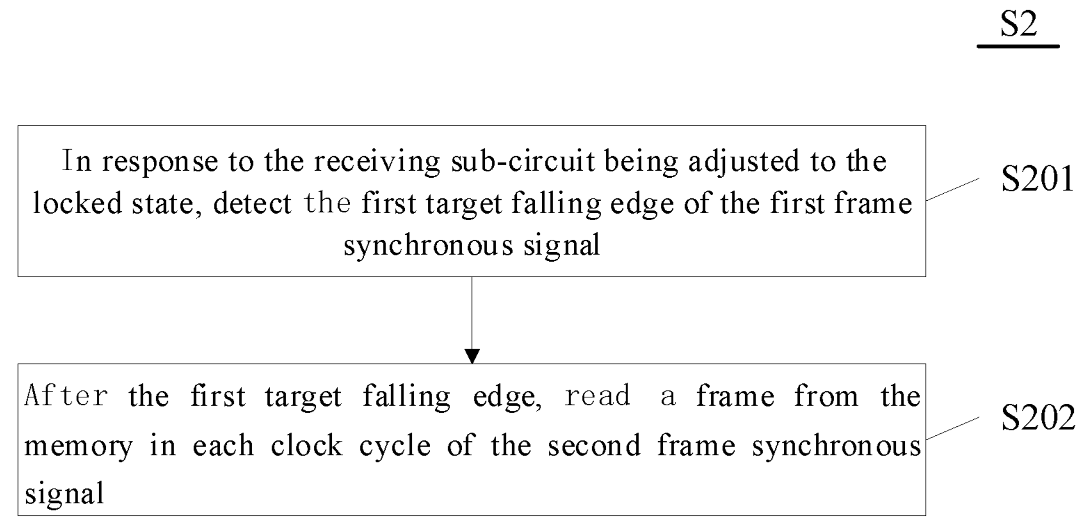
FIG. 5 is a flowchart illustrating a method for implementing step S2 according to an embodiment of the present disclosure.

FIG. 5 is a flowchart of a specific implementation of Step S2 in the embodiment of the present disclosure. Specifically, when the receiving sub-circuit is adjusted to the locked state, the clock recovery lock signal sent to the mainboard is set to be at a low level. As shown in FIG. 5, Step S2 of reading a frame from the memory in each clock cycle of the second frame synchronous signal according to the second frame synchronous signal includes: Step S201 and Step S202.

Step S201 includes, in response to the receiving sub-circuit being adjusted to the locked state, detecting the first target falling edge of the first frame synchronous signal.

Step S202 includes, after the first target falling edge, reading a frame from the memory in each clock cycle of the second frame synchronous signal.

The first target falling edge is the second falling edge following a falling edge of the clock recovery lock signal; thus, data is read from memory starting from the first clock cycle of the local clock after the first target falling edge, so as to reserve time sufficient for writing a frame.

In some embodiments, Step 201 of detecting the first target falling edge of the first frame synchronous signal includes: generating a first frame synchronous enable signal according to the first frame synchronous signal; generating a first frame synchronous selection signal according to a result of AND operation performed on the first frame synchronous signal and the first frame synchronous enable signal; delaying the first frame synchronous selection signal by a certain time interval to generate a first frame synchronous selection delay signal; and determining a pulse width according to a falling edge of the first frame synchronous selection signal and a falling edge of the first frame synchronous selection delay signal, and generating a first frame synchronous pulse signal according to the falling edge of the first frame synchronous selection signal and the pulse width. The high-level region of the first frame synchronous enable signal includes the high-level region of the first frame synchronous signal on a time axis, and the rising edge of the first frame synchronous pulse signal and the first target falling edge are at the same time, so that the frame is read from the memory and sent to the display component according to triggering of the first frame synchronization pulse signal.

Figure 6:
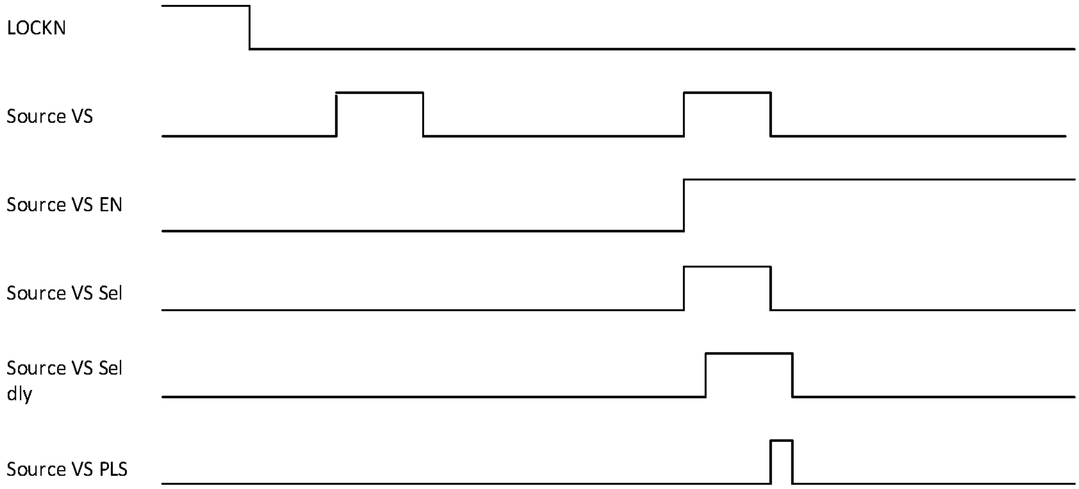
FIG. 6 is a schematic diagram of a plurality of signals in an embodiment of the present disclosure.

FIG. 6 is a schematic diagram of a plurality of signals in an embodiment of the present disclosure. FIG. 6, which corresponds to Steps S201 and S202, exemplarily shows the clock recovery lock signal (LOCKN), the first frame synchronous signal (Source VS), the first frame synchronous enable signal (Source VS EN), the first frame synchronous selection signal (Source VS Sel), the first frame synchronous selection delay signal (Source VS Sel dly), and the first frame synchronous pulse signal (Source VS PLS) in some embodiments.

It should be noted that, the above description of determining the first target falling edge is only an optional implementation provided by the embodiment of the present disclosure, and does not limit the technical solutions of the present disclosure, and other manners for determining the first target falling edge are also applicable to the technical solutions of the present disclosure.

Figure 7:
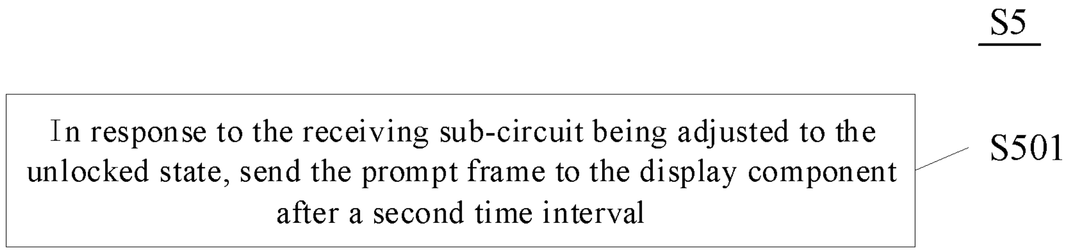
FIG. 7 is a flowchart illustrating a method for implementing step S5 according to an embodiment of the present disclosure.

FIG. 7 is a flowchart of a specific implementation of Step S5 in the embodiment of the present disclosure. Specifically, at this time, the receiving sub-circuit is adjusted to the unlocked state, and the clock recovery lock signal sent to the mainboard is set to be at a high level. As shown in FIG. 7, Step S5 of sending a predetermined prompt frame to the display component in response to the receiving sub-circuit being in the unlocked state includes Step S501.

Step S501 includes, in response to the receiving sub-circuit being adjusted to the unlocked state, sending the prompt frame to the display component after a second time interval.

The second time interval has a length less than or equal to the length of the clock cycle of the second frame synchronous signal. The second time interval is reserved to wait for the reading of the current frame corresponding to the reading operation to be finished, and then send the prompt frame to the display component. While waiting in the second time interval, the current frame that has been read is sent to the display component.

Figure 8:
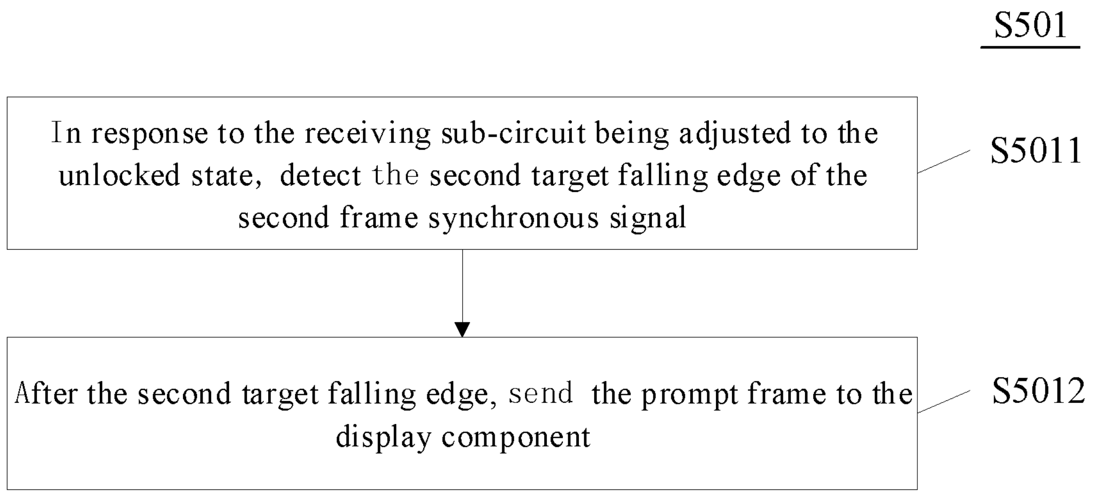
FIG. 8 is a flowchart illustrating a method for implementing step S501 according to an embodiment of the present disclosure.

FIG. 8 is a flowchart of a specific implementation of Step S501 in the embodiment of the present disclosure. As shown in FIG. 8, Step S501 of sending the prompt frame to the display component after the second time interval in response to the receiving sub-circuit being adjusted to the unlocked state includes Steps S5011 and S5012.

Step S5011 includes, in response to the receiving sub-circuit being adjusted to the unlocked state, detecting the second target falling edge of the second frame synchronous signal.

The second target falling edge is the first falling edge following a rising edge of the clock recovery lock signal.

Step S5012 includes, after the second target falling edge, sending the prompt frame to the display component.

The second target falling edge is the first falling edge following a rising edge of the clock recovery lock signal; a second time interval reserved for preventing data read before and after the switching between the locked state and the unlocked state from colliding is determined based on the second target falling edge.

In some embodiments, similarly to determining the first target falling edge, Step S5011 of detecting the second target falling edge of the second frame synchronous signal includes: generating a second frame synchronous enable signal according to the second frame synchronous signal; generating a second frame synchronous selection signal according to a result of AND operation performed on the second frame synchronous signal and the second frame synchronous enable signal; delaying the second frame synchronous selection signal by one clock cycle to generate a second frame synchronous selection delay signal; determining a pulse width according to a falling edge of the second frame synchronous selection signal and a falling edge of the second frame synchronous selection delay signal, and generating a second frame synchronous pulse signal according to a falling edge of the second frame synchronous selection signal and the pulse width. A high level region of the second frame synchronous enable signal includes a high level region of the second frame synchronous signal on the time axis, and the rising edge of the second frame synchronous pulse signal and the second target falling edge are at the same time; and accordingly, sending of the prompt frame to the display component is triggered according to the second frame synchronization pulse signal.

The following describes the image data transmission method provided by the present disclosure in detail in conjunction with practical applications. The image data transmission method is applied to a corresponding image data transmission device, and the image data transmission device belongs to a display system. In an embodiment, the image data transmission device is based on a Field Programmable Gate Array (FPGA for short); the display system includes: a mainboard, an image data transmission device, a display component and a display. Exemplarily, image data transmission is performed among the mainboard, the image data transmission device and the display component on the basis of VBO protocol.

Firstly, the image data transmission device and the mainboard perform handshake according to VBO protocol. After clock data recovery is completed, a phase-locked loop component of the image data transmission device adjusts the receiving sub-circuit to the locked state, and sets the clock recovery lock signal sent to the mainboard to be at a low level; after the handshake is completed, the mainboard converts the video image signal from the signal source into a VBO signal format corresponding to the receiving sub-circuit (interface) and sends the converted signal to the receiving sub-circuit; the writing control component of the image data transmission device writes the image data received by the receiving sub-circuit in each clock cycle of the first frame synchronous signal into a frame of the memory according to the first frame synchronous signal parsed and recovered by the phase-locked loop component; the reading control component of the image data transmission device reads the frame from the memory in each clock cycle of the second frame synchronous signal, according to the second frame synchronous signal. The second frame synchronous signal is a local clock signal, a first time interval exists between the starting time of the second frame synchronous signal and the starting time of the first frame synchronous signal, and the first time interval has a length greater than or equal to the length of the clock cycle of the first frame synchronous signal; the selecting component of the image data transmission device sends, in response to the receiving sub-circuit currently being in the locked state, the frame read by the reading control component to the sending component, and sends the frame to the display component through the sending component; the display component sends the frame to a display panel to display the frame on the display panel.

Then, in response to the change of the frame rate of the video signal of the signal source, the frequency of the associated clock signal corresponding to the mainboard and the image data sent by the mainboard changes. Because the receiving sub-circuit (interface) does not support the dynamic change of the clock, the first frame synchronous signal does not correspond to the associated clock signal of the mainboard any more, the clock is out of lock, and the phase-locked loop component adjusts the receiving sub-circuit from the locked state to the unlocked state; the writing control component immediately stops writing the image data into the memory, and the reading control component stops reading the data from the memory after reading the current frame; the selecting component sends, in response to the receiving sub-circuit being in the unlocked state, a predetermined prompt frame to the sending component after a second time interval, and sends the predetermined prompt frame to the display component through the sending component. The second time interval has a length smaller than or equal to the length of the clock cycle of the second frame synchronous signal; and the display component sends the prompt frame to the display for display. Therefore, when the clock is out of lock on the receiving side of the image data transmission device, the sending side of the image data transmission device sends the prompt frame to the display instead, so that the problem that the display is abnormal due to the fact that the display enters a self-checking state is prevented.

Figure 9:
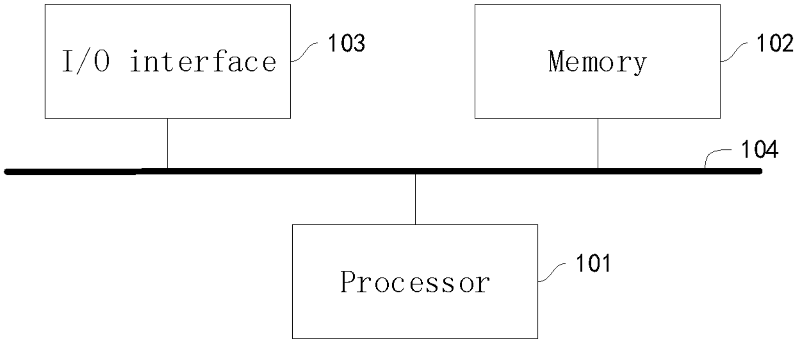
FIG. 9 is a schematic structural diagram of an electronic apparatus according to an embodiment of the present disclosure.

FIG. 9 is a schematic structural diagram of an electronic apparatus according to an embodiment of the present disclosure. As shown in FIG. 9, the electronic apparatus includes: one or more processors 101; a memory 102, on which one or more or more programs are stored, which when executed by the one or more processors, causes the one or more processors to implement the image data transmission method as in any of the above embodiments; and one or more I/O interfaces 103 coupled between the processor and the memory and configured to realize information interaction between the processor and the memory.

The processor 101 is a device with data processing capability, which includes but is not limited to a central processing unit (CPU), etc.; the memory 102 is a device having data storage capability and includes, but is not limited to, a Random Access Memory (RAM, more specifically SDRAM, DDR, etc.), a Read Only Memory (ROM), an Electrically Erasable Programmable Read Only Memory (EEPROM), and a FLASH memory (FLASH); an I/O interface (read/write interface) 103 is coupled between the processor 101 and the memory 102, and may implement information interaction between the processor 101 and the memory 102, which includes but is not limited to a data bus (Bus) and the like.

In some embodiments, the processor 101, the memory 102, and the I/O interface 103 are interconnected via the bus 104, which in turn is coupled to other components of the computing device.

In some embodiments, the one or more processors 101 include a field programmable gate array.

Figure 10:
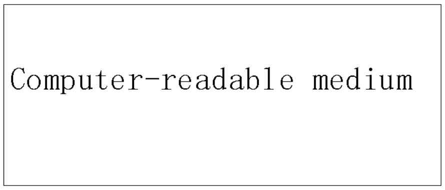
FIG. 10 is a schematic structural diagram of a computer-readable medium according to an embodiment of the present disclosure.

FIG. 10 is a schematic structural diagram of a computer-readable medium according to an embodiment of the present disclosure. The computer-readable medium has a computer program stored thereon, and the computer program, when executed by a processor, implements the steps in the image data transmission method according to any of the above embodiments.

An embodiment of the present disclosure also provides a display system, which includes: a mainboard, an image data transmission device, and a display component. The image data transmission device is the image data transmission device in any one of the above embodiments. In some embodiments, the display component includes a Tcon board and a display.

It will be understood by those of ordinary skill in the art that all or some of the steps of the methods, and functional components/units in the devices disclosed above may be implemented as software, firmware, hardware, or suitable combinations thereof. In a hardware implementation, the division between functional components/units mentioned in the above description does not necessarily correspond to the division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on computer-readable medium, which may include computer storage medium (or non-transitory medium) and communication medium (or transitory medium). The term "computer storage medium"

includes volatile and nonvolatile, removable and non-removable medium implemented in any method or technology for storage of information such as computer-readable instructions, data structures, program components or other data, as is well known to those skilled in the art. Computer storage medium includes, but is not limited to, RAM, ROM, EEPROM, flash memory or other memory technology, CD-ROM, digital versatile disk (DVD) or other optical disk storage, magnetic cassette, magnetic tape, magnetic disk storage or other magnetic storage device, or any other medium which may be used to store the desired information and which may be accessed by a computer. In addition, communication medium typically includes computer-readable instructions, data structures, program modules or other data in a modulated data signal such as a carrier wave or other transport mechanism, and may include any information delivery medium, as is well known to those skilled in the art.

Example embodiments have been disclosed herein, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

What is claimed is:

1. An image data transmission device, comprising:

a receiving sub-circuit configured to receive image data sent by a mainboard;

a writing control component configured to write, in response to the receiving sub-circuit being in a locked state, image data received by the receiving sub-circuit in each clock cycle of a first frame synchronous signal into a frame of a memory according to the first frame synchronous signal, the first frame synchronous signal being an associated clock signal, and stop, in response to the receiving sub-circuit being in an unlocked state, writing the image data to the memory;

a reading control component configured to read, in response to the receiving sub-circuit being in the locked state, a frame from the memory in each clock cycle of a second frame synchronous signal according to the second frame synchronous signal, wherein a first time interval exists between writing and reading a same frame, the first time interval has a length greater than or equal to a length of the clock cycle of the first frame synchronous signal, and the second frame synchronous signal is a local clock signal; and a sending component configured to send the frame read by the reading control component to a display component, wherein the image data transmission device further comprises a selecting component, wherein the reading control component is further configured to read the frame from the memory in each clock cycle of the second frame synchronous signal and send the frame to the selecting component;

the selecting component is configured to send, in response to the receiving sub-circuit being in the locked state, each frame read by the reading control component to the sending component; and send, in response to the receiving sub-circuit being in the unlocked state, a predetermined prompt frame to the sending component; and the sending component is configured to send the frame selected by the selecting component to the display component, wherein the selecting component is further configured to send, in response to the receiving sub-circuit being adjusted to the unlocked state, the prompt frame to the sending component after a second time interval, and wherein the second time interval has a length smaller than or equal to a length of the clock cycle of the second frame synchronous signal.

2. The image data transmission device according to claim 1, further comprising:

a phase-locked loop component configured to parse and recover the first frame synchronous signal; and adjust the receiving sub-circuit to the locked state or the unlocked state.

3. The image data transmission device according to claim 2, wherein the phase-locked loop component is further configured to set a clock recovery lock signal sent to the mainboard to be at a low level in response to adjusting the receiving sub-circuit to the locked state; and set the clock recovery lock signal sent to the mainboard to be at a high level in response to adjusting the receiving sub-circuit to the unlocked state.

4. The image data transmission device according to claim 1, wherein the reading control component is further configured to read, in response to the receiving sub-circuit being in the locked state, the frame from the memory in each clock cycle of the second frame synchronous signal after a first target falling edge of the first frame synchronous signal, and wherein the first target falling edge is the second falling edge following a falling edge of the clock recovery lock signal.

5. The image data transmission device according to claim 1, wherein the selecting component is further configured to send, in response to the receiving sub-circuit being adjusted to the unlocked state, the prompt frame to the sending component after a second target falling edge of the second frame synchronous signal, and wherein the second target falling edge is the first falling edge following a rising edge of the clock recovery lock signal.

6. The image data transmission device according to claim 2, wherein during handshake with the mainboard according to a VBO protocol, the phase-locked loop component is further configured to adjust the receiving sub-circuit to the locked state after clock data recovery is completed.

7. The image data transmission device according to claim 2, wherein the phase-locked loop component is further configured to adjust the receiving sub-circuit from the locked state to the unlocked state in response to an increase or a decrease of a frequency of an associated clock signal of the mainboard.

8. A display system, comprising:

a mainboard, an image data transmission device, and a display component, wherein the image data transmission device is the image data transmission device as claimed in claim 1.

9. An image data transmission method, comprising:

in response to a receiving sub-circuit being in a locked state, receiving, by the receiving sub-circuit, image data sent by a mainboard, and writing, according to a first frame synchronous signal, the image data received from the mainboard in each clock cycle of the first frame synchronous signal into a frame of a memory, the first frame synchronous signal being an associated clock signal;

in response to the receiving sub-circuit being in the locked state, reading, according to a second frame synchronous signal, a frame from the memory in each clock cycle of the second frame synchronous signal, wherein a first time interval exists between writing and reading a same frame, the first time interval has a length greater than or equal to a length of the clock cycle of the first frame synchronous signal, and the second frame synchronous signal is a local clock signal;

sending each frame read from the memory to a display component; and in response to the receiving sub-circuit being in an unlocked state, stopping writing the image data sent by the mainboard into the memory, wherein the method further comprises:

in response to the receiving sub-circuit being in the locked state, sending each frame read from the memory to the display component; and in response to the receiving sub-circuit being in the unlocked state, sending a predetermined prompt frame to the display component, wherein in response to the receiving sub-circuit being in the unlocked state, sending a predetermined prompt frame to the display component comprises:

in response to the receiving sub-circuit being adjusted to the unlocked state, sending the prompt frame to the display component after a second time interval, wherein the second time interval has a length less than or equal to a length of the clock cycle of the second frame synchronous signal.

10. The image data transmission method according to claim 9, wherein before writing, according to a first frame synchronous signal, the image data received from the mainboard in each clock cycle of the first frame synchronous signal into a frame of a memory, the image data transmission method further comprises:

handshaking with the mainboard according to a VBO protocol, wherein after clock data recovery is completed, the receiving sub-circuit is adjusted to the locked state, and a clock recovery lock signal sent to the mainboard is set to be at a low level.

11. The image data transmission method according to claim 9, wherein reading, according to a second frame synchronous signal, a frame from the memory in each clock cycle of the second frame synchronous signal comprises:

detecting a first target falling edge of the first frame synchronous signal in response to the receiving sub-circuit being adjusted to the locked state, wherein the first target falling edge is the second falling edge following a falling edge of the clock recovery lock signal; and reading the frame from the memory in each clock cycle of the second frame synchronous signal after the first target falling edge.

12. The image data transmission method according to claim 9, wherein in response to an increase or decrease of a frequency of an associated clock signal of the mainboard, the receiving sub-circuit is adjusted from the locked state to the unlocked state, and the clock recovery lock signal sent to the mainboard is set to be at a high level.

13. The image data transmission method according to claim 9, wherein in response to the receiving sub-circuit being adjusted to the unlocked state, sending the prompt frame to the display component after a second time interval comprises:

detecting a second target falling edge of the second frame synchronous signal in response to the receiving sub-circuit being adjusted to the unlocked state, wherein the second target falling edge is the first falling edge following a rising edge of the clock recovery lock signal; and after the second target falling edge, sending the prompt frame to the display component.

14. An electronic apparatus, comprising:

one or more processors; and a memory for storing one or more programs, wherein the one or more programs, when executed by the one or more processors, cause the one or more processors to implement the image data transmission method of claim 10.

15. The electronic apparatus of claim 14, wherein the processor comprises a field programmable gate array.

16. A non-transitory computer-readable storage medium, on which a computer program is stored, wherein the computer program, when being executed by a processor, carries out steps of the image data transmission method according to claim 10.

* * * * *